United States Patent
Koda et al.

(10) Patent No.: US 9,732,206 B2
(45) Date of Patent: Aug. 15, 2017

(54) COPOLYMER, RUBBER COMPOSITION USING SAME, AND TIRE

(71) Applicants: KURARAY CO., LTD., Kurashiki-shi (JP); AMYRIS, INC., Emeryville, CA (US)

(72) Inventors: Daisuke Koda, Kamisu (JP); Kei Hirata, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 31 days.

(21) Appl. No.: 14/390,660

(22) PCT Filed: Apr. 2, 2013

(86) PCT No.: PCT/JP2013/060128
§ 371 (c)(1),
(2) Date: Oct. 3, 2014

(87) PCT Pub. No.: WO2013/151069
PCT Pub. Date: Oct. 10, 2013

(65) Prior Publication Data
US 2015/0087763 A1    Mar. 26, 2015

(30) Foreign Application Priority Data
Apr. 4, 2012  (JP) ................................ 2012-085929

(51) Int. Cl.
| | | |
|---|---|---|
| C08L 9/06 | (2006.01) | |
| B60C 1/00 | (2006.01) | |
| C08F 236/08 | (2006.01) | |
| C08K 3/04 | (2006.01) | |
| C08K 3/36 | (2006.01) | |
| C08L 47/00 | (2006.01) | |
| C08F 236/22 | (2006.01) | |
| C08L 21/00 | (2006.01) | |
| C08F 236/20 | (2006.01) | |
| C08L 7/00 | (2006.01) | |

(52) U.S. Cl.
CPC ...... *C08L 9/06* (2013.01); *B60C 1/00* (2013.01); *C08F 236/08* (2013.01); *C08F 236/20* (2013.01); *C08F 236/22* (2013.01); *C08K 3/04* (2013.01); *C08K 3/36* (2013.01); *C08L 21/00* (2013.01); *C08L 47/00* (2013.01); *C08K 2201/005* (2013.01); *C08L 7/00* (2013.01); *C08L 2205/02* (2013.01); *C08L 2205/03* (2013.01)

(58) Field of Classification Search
CPC ............ C08F 236/08; B60C 1/00; C08L 9/06
See application file for complete search history.

(56) References Cited

U.S. PATENT DOCUMENTS

| | | |
|---|---|---|
| 7,655,739 B1 | 2/2010 | McPhee et al. |
| 7,759,444 B1 | 7/2010 | McPhee |
| 2007/0123636 A1 | 5/2007 | Hattori et al. |
| 2010/0056714 A1* | 3/2010 | McPhee .................. C08C 19/02 524/579 |
| 2010/0056743 A1 | 3/2010 | McPhee |
| 2010/0331511 A1 | 12/2010 | McPhee |
| 2010/0331800 A1 | 12/2010 | McPhee |
| 2012/0010370 A1 | 1/2012 | McPhee |
| 2012/0130033 A1 | 5/2012 | McPhee |
| 2012/0165474 A1 | 6/2012 | McPhee et al. |
| 2012/0244304 A1 | 9/2012 | McPhee |
| 2014/0213715 A1 | 7/2014 | Kuwahara et al. |
| 2014/0371415 A1 | 12/2014 | Washizu |
| 2015/0025193 A1 | 1/2015 | Doolan et al. |
| 2015/0038657 A1 | 2/2015 | Washizu |

FOREIGN PATENT DOCUMENTS

| | | |
|---|---|---|
| CN | 103748158 | 4/2014 |
| CN | 104203989 | 12/2014 |
| EP | 1 790 688 A1 | 5/2007 |
| EP | 2 810 963 A1 | 12/2014 |
| JP | 2010 209256 | 9/2010 |
| JP | 2011 195804 | 10/2011 |
| JP | 2012 502135 | 1/2012 |
| JP | 2012 502136 | 1/2012 |
| WO | 2010 027463 | 3/2010 |
| WO | 2010 027464 | 3/2010 |
| WO | 2013 047347 | 4/2013 |
| WO | 2013 047348 | 4/2013 |
| WO | WO 2013/128977 A1 | 9/2013 |

OTHER PUBLICATIONS

Extended European Search Report issued Oct. 21, 2015 in Patent Application No. 13772956.2.
Chinese Office Action issued Feb. 2, 2016, in corresponding Chinese Patent Application No. 201380018349.1.
U.S. Appl. No. 14/390,637, filed Oct. 3, 2014, Koda, et al.
U.S. Appl. No. 14/390,581, filed Oct. 3, 2014, Koda, et al.
International Search Report Issued Jul. 2, 2013 in PCT/JP13/060128 Filed Apr. 2, 2013.

\* cited by examiner

*Primary Examiner* — Lanee Reuther
(74) *Attorney, Agent, or Firm* — Oblon, McClelland, Maier & Neustadt, L.L.P.

(57) ABSTRACT

The present invention relates to a copolymer including a monomer unit (a) derived from isoprene and a monomer unit (b) derived from farnesene; a process for producing the copolymer including at least the step of copolymerizing isoprene with farnesene; a rubber composition including (A) the copolymer, (B) a rubber component and (C) carbon black; a rubber composition including (A) the copolymer, (B) a rubber component and (D) silica; a rubber composition including (A) the copolymer, (B) a rubber component, (C) carbon black and (D) silica; and a tire using the rubber composition at least as a part thereof.

23 Claims, No Drawings

COPOLYMER, RUBBER COMPOSITION USING SAME, AND TIRE

CROSS-REFERENCE TO RELATED APPLICATIONS

This application is a National Stage of PCT/JP2013/060128, which was filed on Apr. 2, 2013. This application is based upon and claims the benefit of priority to Japanese Application No. 2012-085929, which was filed on Apr. 4, 2012.

TECHNICAL FIELD

The present invention relates to a copolymer containing a monomer unit derived from farnesene, a rubber composition containing the copolymer, and a tire using the rubber composition.

BACKGROUND ART

Hitherto, in the application field of tires for which a wear resistance and a mechanical strength are required, there have been extensively used rubber compositions that are enhanced in mechanical strength by incorporating a reinforcing agent such as carbon black in a rubber component such as a natural rubber and a styrene-butadiene rubber. It is known that the carbon black exhibits its reinforcing effect by physically or chemically adsorbing the aforementioned rubber component onto a surface of respective particles of the carbon black. Therefore, when the particle size of the carbon black used in the rubber composition is as large as from about 100 to about 200 nm, it is generally difficult to attain a sufficient interaction between the carbon black and the rubber component, so that the resulting rubber composition tends to be hardly improved in mechanical strength to a sufficient extent. In addition, tires produced from such a rubber composition tend to exhibit a low hardness and therefore tend to be insufficient in steering stability.

On the other hand, when the carbon black used in the rubber composition has an average particle size as small as from about 5 to about 100 nm and therefore a large specific surface area, the resulting rubber composition can be improved in properties such as mechanical strength and wear resistance owing to a large interaction between the carbon black and the rubber component. In addition, tires produced from such a rubber composition can be improved in steering stability owing to an increased hardness thereof.

However, in the case where the carbon black having such a small average particle size is used in the rubber composition, it is known that the resulting rubber composition tends to be deteriorated in dispersibility of the carbon black therein owing to a high cohesive force between the carbon black particles. The deteriorated dispersibility of the carbon black in the rubber composition tends to induce a prolonged kneading step and therefore tends to give an adverse influence on productivity of the rubber composition. Also, the deteriorated dispersibility of the carbon black tends to cause generation of heat in the rubber composition, so that tires produced therefrom tend to be deteriorated in rolling resistance performance and may frequently fail to satisfy the requirements for low rolling resistance tires, i.e., so-called low-fuel consumption tires. Furthermore, in the case where the carbon black used in the rubber composition has a small average particle size, there tends to occur such a problem that the resulting rubber composition exhibits a high viscosity and therefore is deteriorated in processability.

Thus, the mechanical strength and hardness of the rubber composition for tires are properties having a contradictory relation with the rolling resistance performance and processability thereof, and it is therefore considered that the rubber composition is hardly improved in both of the properties in a well-balanced manner.

In Patent Document 1, as a rubber composition that can be improved in the aforementioned properties in a well-balanced manner, there is described the rubber composition for tires which includes a rubber component containing an isoprene-based rubber and a styrene-butadiene rubber, carbon black and a liquid resin having a softening point of from −20 to 20° C. at a specific compounding ratio.

Also, Patent Document 2 describes the tire including a rubber component containing a diene-based rubber constituted of a modified styrene-butadiene copolymer and a modified conjugated diene-based polymer, and a filler such as carbon black at a specific compounding ratio.

However, any of the tires described in these Patent Documents fail to satisfy the mechanical strength and hardness as well as the rolling resistance performance and processability with a sufficiently high level, and therefore there is still a strong demand for tires that are further improved in these properties.

Meanwhile, Patent Document 3 and Patent Document 4 describe a polymer of β-farnesene, but fail to have a sufficient study on practical applications thereof.

CITATION LIST

Patent Literature

Patent Document 1: JP 2011-195804A
Patent Document 2: JP 2010-209256A
Patent Document 3: WO 2010/027463A
Patent Document 4: WO 2010/027464A

SUMMARY OF INVENTION

Technical Problem

The present invention has been made in view of the above conventional problems. The present invention provides a copolymer capable of enhancing a dispersibility of a filler such as carbon black and silica in a rubber composition when using the copolymer as a part of the rubber composition; a rubber composition that contains the copolymer, not only exhibits a good processability upon compounding, molding or curing but also is excellent in rolling resistance performance and wear resistance, and further hardly suffers from deterioration in mechanical strength and hardness; and a tire obtained using the rubber composition.

Solution to Problem

As a result of extensive and intensive researches, the present inventors have found that when using a copolymer containing a monomer unit derived from isoprene and a monomer unit derived from farnesene in a rubber composition, the resulting rubber composition can be enhanced in not only processability but also mechanical strength, wear resistance and rolling resistance performance. The present invention has been accomplished on the basis of the above finding.

That is, the present invention relates to the following aspects.

[1] A copolymer including a monomer unit (a) derived from isoprene and a monomer unit (b) derived from farnesene.
[2] A process for producing the copolymer, including at least the step of copolymerizing isoprene with farnesene.
[3] A rubber composition including (A) the above copolymer; (B) a rubber component; and (C) carbon black.
[4] A rubber composition including (A) the above copolymer; (B) a rubber component; and (D) silica.
[5] A rubber composition including (A) the above copolymer; (B) a rubber component; (C) carbon black; and (D) silica.
[6] A tire using the above rubber composition at least as a part thereof.

Advantageous Effects of Invention

According to the present invention, it is possible to provide a copolymer capable of enhancing a dispersibility of a filler such as carbon black and silica in a rubber composition when using the copolymer as a part of the rubber composition; a rubber composition that contains the copolymer, not only exhibits a good processability upon compounding, molding or curing but also is excellent in rolling resistance performance and wear resistance, and further hardly suffers from deterioration in mechanical strength and hardness; and a tire obtained using the rubber composition.

DESCRIPTION OF EMBODIMENTS

[Copolymer]

The copolymer according to the present invention is a copolymer including a monomer unit (a) derived from isoprene and a monomer unit (b) derived from farnesene.

In the present invention, the monomer unit (b) may be either a monomer unit derived from α-farnesene or a monomer unit derived from β-farnesene represented by the following formula (I). However, of these monomer units, from the viewpoint of facilitated production of the copolymer, preferred is the monomer unit derived from β-farnesene. Meanwhile, α-farnesene and β-farnesene may be used in combination with each other.

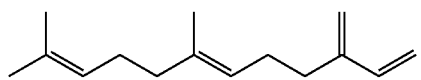

(I)

The weight-average molecular weight (Mw) of the copolymer is preferably from 2,000 to 500,000, more preferably from 8,000 to 500,000, still more preferably from 15,000 to 450,000 and even still more preferably from 15,000 to 300,000. When the weight-average molecular weight of the copolymer falls within the above-specified range, the below-mentioned rubber composition has a good processability, and further can be improved in dispersibility of the carbon black or silica compounded therein and therefore can exhibit a good rolling resistance performance. Meanwhile, the weight-average molecular weight of the copolymer as used in the present specification is the value measured by the method described below in Examples. In the present invention, two or more kinds of copolymers that are different in weight-average molecular weight from each other may be used in the form of a mixture thereof.

The melt viscosity of the copolymer as measured at 38° C. is preferably from 0.1 to 3,000 Pa·s, more preferably from 0.6 to 2,800 Pa·s, still more preferably from 1.5 to 2,600 Pa·s and even still more preferably from 1.5 to 800 Pa·s. When the melt viscosity of the copolymer falls within the above-specified range, the resulting rubber composition can be easily kneaded and can be improved in processability. Meanwhile, in the present specification, the melt viscosity of the copolymer is the value measured by the method described below in Examples.

The mass ratio of the monomer unit (a) to a sum of the monomer unit (a) and the monomer unit (b) in the copolymer is preferably from 1 to 99% by mass, more preferably from 10 to 80% by mass and still more preferably from 15 to 70% by mass from the viewpoint of enhancing a processability and a rolling resistance performance of the resulting rubber composition.

The molecular weight distribution (Mw/Mn) of the copolymer is preferably from 1.0 to 4.0, more preferably from 1.0 to 3.0 and still more preferably from 1.0 to 2.0. When the molecular weight distribution (Mw/Mn) of the copolymer falls within the above-specified range, the resulting copolymer can suitably exhibit a less variation in viscosity thereof.

The copolymer according to the present invention may be any suitable copolymer as long as it is produced at least by copolymerizing isoprene with farnesene, and the copolymer may also be produced by copolymerizing the other monomer with the isoprene and farnesene.

Examples of the other monomer include conjugated dienes such as butadiene, 2,3-dimethyl-1,3-butadiene, 2-phenyl-1,3-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene; and aromatic vinyl compounds such as styrene, α-methyl styrene, 2-methyl styrene, 3-methyl styrene, 4-methyl styrene, 2,4-diisopropyl styrene, 2,4-dimethyl styrene, 4-tert-butyl styrene and 5-tert-butyl-2-methyl styrene. Of these other monomers, preferred are butadiene, myrcene, styrene, α-methyl styrene and 4-methyl styrene.

The content of the other monomer in the copolymer is preferably not more than 50% by mass, more preferably not more than 40% by mass and still more preferably not more than 30% by mass.

[Process for Producing Copolymer]

The copolymer according to the present invention is preferably produced by the production process of the present invention which includes at least the step of copolymerizing isoprene with farnesene. More specifically, the copolymer may be produced by an emulsion polymerization method, a solution polymerization method or the like. Of these methods, preferred is the solution polymerization method.

(Emulsion Polymerization Method)

The emulsion polymerization method for producing the copolymer may be any suitable conventionally known method. For example, a predetermined amount of a farnesene monomer and a predetermined amount of an isoprene monomer are emulsified and dispersed in the presence of an emulsifying reagent, and then the resulting emulsion is subjected to emulsion polymerization using a radical polymerization initiator.

As the emulsifying reagent, there may be used, for example, a long-chain fatty acid salt having 10 or more carbon atoms or a rosinic acid salt. Specific examples of the emulsifying reagent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization reaction system.

Examples of the radical polymerization initiator include persulfates such as ammonium persulfate and potassium persulfate; and organic peroxides and hydrogen peroxide.

In order to adjust a molecular weight of the resulting copolymer, there may be used a chain transfer reagent. Examples of the chain transfer reagent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After stopping the polymerization reaction, an antioxidant may be added to the polymerization reaction system, if required. Furthermore, after stopping the polymerization reaction, unreacted monomers may be removed from the resulting latex, if required. Thereafter, the resulting copolymer is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the copolymer. The thus recovered copolymer is washed with water and dehydrated, and then dried to obtain the copolymer. Meanwhile, upon coagulating the copolymer, the latex may be previously mixed, if required, with an extender oil in the form of an emulsified dispersion to recover the copolymer in the form of an oil-extended rubber.

(Solution Polymerization Method)

The solution polymerization method for producing the copolymer may be any suitable conventionally known method. For example, a farnesene monomer may be polymerized with an isoprene monomer in a solvent using a Ziegler-based catalyst, a metallocene-based catalyst or an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the farnesene polymer as required, and is preferably from 0.01 to 3 parts by mass on the basis of 100 parts by mass of farnesene.

The organic alkali metal compound may be used in the form of an organic alkali metal amide by allowing a secondary amine such as dibutyl amine, dihexyl amine and dibenzyl amine to react therewith.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

The polar compound may be used in the anion polymerization for controlling a microstructure or a random structure of a moiety derived from farnesene or a moiety derived from isoprene without causing deactivation of the reaction. Examples of the polar compound include ether compounds such as dibutyl ether, diethyl ether, tetrahydrofuran, dioxane and ethylene glycol diethyl ether; pyridine; tertiary amines such as tetramethyl ethylenediamine and trimethylamine; and alkali metal alkoxides such as potassium-t-butoxide; and phosphine compounds. The polar compound is preferably used in an amount of from 0.01 to 1,000 mol equivalent on the basis of the organic alkali metal compound.

The copolymer according to the present invention is preferably produced by conducting an anionic polymerization in the presence of an organic metal initiator such as the above organic alkali metal compounds from the viewpoint of readily controlling a molecular weight distribution of the resulting copolymer within the aforementioned range.

The temperature used in the above polymerization reaction is usually from −80 to 150° C., preferably from 0 to 100° C. and more preferably from 10 to 90° C. The polymerization method may be either a batch method or a continuous method. The farnesene and isoprene are respectively supplied to the reaction solution in a continuous or intermittent manner such that the compositional ratio of the farnesene and isoprene in the polymerization system falls within a specific range, or a mixture of the farnesene and isoprene which has been previously prepared such that a compositional ratio of these compounds is controlled to a specific range is supplied to the reaction solution, whereby it is possible to produce a random copolymer. Alternatively, the farnesene and isoprene are sequentially polymerized in the reaction solution such that a compositional ratio of these compounds in the polymerization system is controlled to a specific range, whereby it is possible to produce a block copolymer.

The polymerization reaction may be stopped by adding an alcohol such as methanol and isopropanol as a terminating reagent to the reaction system. The resulting polymerization reaction solution may be poured into a poor solvent such as methanol to precipitate the copolymer. Alternatively, the polymerization reaction solution may be washed with water, and then a solid is separated therefrom and dried to isolate the copolymer therefrom.

{Modified Copolymer}

The copolymer according to the present invention may be used in a modified form. Examples of a functional group used for modifying the copolymer include an amino group, an alkoxysilyl group, a hydroxyl group, an epoxy group, a carboxyl group, a carbonyl group, a mercapto group, an isocyanate group and an acid anhydride group.

As the method of producing the modified copolymer, there may be used, for example, the method in which before adding the terminating reagent, a coupling reagent such as tin tetrachloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying reagent such as 4,4'-bis(diethylamino)benzophenone and N-vinyl pyrrolidone, or the other modifying reagent as described in JP 2011-132298A is added to the polymerization reaction system. Furthermore, the isolated copolymer may be grafted with maleic anhydride or the like.

In the modified copolymer, the site of the polymer into which the functional group is introduced may be either a chain end or a side chain of the polymer. In addition, these functional groups may be used alone or in combination of any two or more thereof. The modifying reagent may be used in an amount of from 0.01 to 100 mol equivalent and preferably from 0.01 to 10 mol equivalent on the basis of the organic alkali metal compound.

[Rubber Composition]

The first rubber composition according to the present invention includes (A) the above copolymer according to the present invention; (B) a rubber component; and (C) carbon black.

The second rubber composition according to the present invention includes (A) the above copolymer according to the present invention; (B) a rubber component; and (D) silica.

The third rubber composition according to the present invention includes (A) the above copolymer according to the present invention; (B) a rubber component; (C) carbon black; and (D) silica.

<Rubber Component (B)>

Examples of the rubber component (B) used herein include a natural rubber, a styrene-butadiene rubber (hereinafter also referred to merely as "SBR"), a butadiene rubber, an isoprene rubber, a butyl rubber, a halogenated butyl rubber, an ethylene propylene diene rubber, an ethylene propylene diene rubber, a butadiene acrylonitrile copolymer rubber and a chloroprene rubber. Of these rubbers, preferred are SBR, a natural rubber, a butadiene rubber and an isoprene rubber, and more preferred are SBR and a natural rubber. These rubbers may be used alone or in combination of any two or more thereof.

[Natural Rubber]

Examples of the natural rubber used as the rubber component (B) in the present invention include natural rubbers ordinarily used in tire industries, e.g., TSR such as SMR, SIR and STR; and RSS, etc.; high-purity natural rubbers; and modified natural rubbers such as epoxidized natural rubbers, hydroxylated natural rubbers, hydrogenated natural rubbers and grafted natural rubbers. Among these natural rubbers, STR20, SMR20 and RSS#3 are preferred from the viewpoints of a less variation in quality and a good availability. These natural rubbers may be used alone or in combination of any two or more thereof.

[Synthetic Rubber]

Examples of a synthetic rubber used as the rubber component (B) in the present invention include SBR, a butadiene rubber, an isoprene rubber, a butyl rubber, a halogenated butyl rubber, an ethylene propylene diene rubber, a butadiene acrylonitrile copolymer rubber and a chloroprene rubber. Of these rubbers, preferred are SBR, an isoprene rubber and a butadiene rubber.

(SBR)

As SBR, there may be used those generally used in the applications of tires. More specifically, the SBR preferably has a styrene content of from 0.1 to 70% by mass and more preferably from 5 to 50% by mass. Also, the SBR preferably has a vinyl content of from 0.1 to 60% by mass and more preferably from 0.1 to 55% by mass.

The weight-average molecular weight (Mw) of the SBR is preferably from 100,000 to 2,500,000, more preferably from 150,000 to 2,000,000 and still more preferably from 200,000 to 1,500,000. When the weight-average molecular weight of the SBR falls within the above-specified range, the resulting rubber composition can be enhanced in both processability and mechanical strength. Meanwhile, in the present specification, the weight-average molecular weight is the value measured by the method described below in Examples.

The glass transition temperature (Tg) of the SBR used in the present invention as measured by differential thermal analysis is preferably from $-95°$ C. to $0°$ C. and more preferably from $-95°$ C. to $-5°$ C. When adjusting Tg of the SBR to the above-specified range, it is possible to suppress increase in viscosity of the SBR and enhance a handling property thereof.

<<Method for Producing SBR>>

The SBR usable in the present invention may be produced by copolymerizing styrene and butadiene. The production method of the SBR is not particularly limited, and the SBR may be produced by any of an emulsion polymerization method, a solution polymerization method, a vapor phase polymerization method and a bulk polymerization method. Of these polymerization methods, preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying reagent, and then the resulting emulsion is subjected to emulsion polymerization using a radical polymerization initiator.

As the emulsifying reagent, there may be used, for example, a long-chain fatty acid salt having 10 or more carbon atoms or a rosinic acid salt. Specific examples of the emulsifying reagent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent gives any adverse influence on stability upon the polymerization.

Examples of the radical polymerization initiator include persulfates such as ammonium persulfate and potassium persulfate, organic peroxides and hydrogen peroxide.

In order to suitably adjust a molecular weight of the obtained E-SBR, there may be used a chain transfer reagent. Examples of the chain transfer reagent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After stopping the polymerization reaction, an antioxidant may be added to the polymerization reaction system, if required. Furthermore, after stopping the polymerization reaction, unreacted monomers may be removed from the resulting latex, if required. Thereafter, the obtained polymer is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer as a crumb. The thus recovered crumb is washed with water and dehydrated, and then dried using a band dryer or the like to obtain E-SBR. Meanwhile, upon coagulating the polymer, the latex may be previously mixed, if required, with an extender oil in the form of an emulsified dispersion to recover the polymer in the form of an oil-extended rubber.

(ii) Solution-Polymerized Styrene-Butadiene Rubber (S-SBR)

S-SBR may be produced by an ordinary solution polymerization method. For example, styrene and butadiene are polymerized in a solvent using an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may be used in the form of an organic alkali metal amide by allowing a secondary amine such as dibutyl amine, dihexyl amine and dibenzyl amine to react therewith.

Examples of the polar compound include ether compounds such as dibutyl ether, diethyl ether, tetrahydrofuran, dioxane and ethylene glycol diethyl ether; pyridine; tertiary amines such as tetramethyl ethylenediamine and trimethylamine; and alkali metal alkoxides such as potassium-t-butoxide; and phosphine compounds. The polar compound is preferably used in an amount of from 0.01 to 1000 mol equivalent on the basis of the organic alkali metal compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents is preferably used in such an amount that a monomer is usually dissolved therein at a concentration of from 1 to 50% by mass.

The temperature used in the above polymerization reaction is usually from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to the reaction solution in a continuous or intermittent manner such that a compositional ratio between the styrene and butadiene in the polymerization system falls within a specific range.

The polymerization reaction may be stopped by adding an alcohol such as methanol and isopropanol as a terminating reagent to the reaction system. The polymerization reaction solution obtained after stopping the polymerization reaction may be directly subjected to drying or steam stripping to remove the solvent therefrom, thereby recovering the S-SBR as aimed. Meanwhile, before removing the solvent, the polymerization reaction solution may be previously mixed with an extender oil to recover the S-SBR in the form of an oil-extended rubber.

{Modified Styrene-Butadiene Rubber (Modified SBR)}

In the present invention, there may also be used a modified SBR produced by introducing a functional group into SBR. Examples of the functional group to be introduced into SBR include an amino group, an alkoxysilyl group, a hydroxyl group, an epoxy group and a carboxyl group.

As the method of producing the modified SBR, there may be used, for example, the method in which before adding the terminating reagent, a coupling reagent such as tin tetrachloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying reagent such as 4,4'-bis(diethylamino)benzophenone and N-vinyl pyrrolidone, or the other modifying reagent as described in JP 2011-132298A is added to the polymerization reaction system.

In the modified SBR, the site of the polymer into which the functional group is introduced may be either a chain end or a side chain of the polymer.

(Isoprene Rubber)

The isoprene rubber may be a commercially available isoprene rubber which may be obtained, for example, by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; or an organic alkali metal compound as used similarly for production of the S-SBR. Among these isoprene rubbers, preferred are isoprene rubbers obtained by the polymerization using the Ziegler-based catalyst because of a high cis isomer content thereof. In addition, there may also be used those isoprene rubbers having an ultrahigh cis isomer content which are produced using the lanthanoid-based rare earth metal catalyst.

The isoprene rubber has a vinyl content of 50% by mass or less, preferably 40% by mass or less, and more preferably 30% by mass or less. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably −20° C. or lower and more preferably −30° C. or lower.

The weight-average molecular weight of the isoprene rubber is preferably from 90,000 to 2,000,000 and more preferably from 150,000 to 1,500,000. When the weight-average molecular weight of the isoprene rubber falls within the above-specified range, the resulting rubber composition can exhibit a good processability and a good mechanical strength.

The isoprene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

(Butadiene Rubber)

The butadiene rubber may be a commercially available butadiene rubber which may be obtained, for example, by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; or an organic alkali metal compound as used similarly for production of the S-SBR. Among these butadiene rubbers, preferred are butadiene rubbers obtained by the polymerization using the Ziegler-based catalyst because of a high cis isomer content thereof. In addition, there may also be used those butadiene rubbers having an ultrahigh cis isomer content which are produced using the lanthanoid-based rare earth metal catalyst.

The butadiene rubber has a vinyl content of 50% by mass or less, preferably 40% by mass or less, and more preferably 30% by mass or less. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably −40° C. or lower and more preferably −50° C. or lower.

The weight-average molecular weight of the butadiene rubber is preferably from 90,000 to 2,000,000, more preferably from 150,000 to 1,500,000 and still more preferably from 250,000 to 800,000. When the weight-average molecular weight of the butadiene rubber falls within the above-specified range, the resulting rubber composition can exhibit a good processability and a good mechanical strength.

The butadiene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

As the synthetic rubber other than the SBR, the isoprene rubber and the butadiene rubber, there may be used one or more rubbers selected from the group consisting of a butyl rubber, a halogenated butyl rubber, an ethylene propylene diene rubber, a butadiene acrylonitrile copolymer rubber and a chloroprene rubber. The method of producing these rubbers is not particularly limited, and any suitable commercially available synthetic rubbers may also be used in the present invention.

In the present invention, when using the rubber component (B) in combination with the aforementioned copolymer (A), it is possible to improve a processability of the resulting rubber composition, a dispersibility of carbon black, silica, etc., therein and a rolling resistance performance thereof.

When using a mixture of two or more kinds of synthetic rubbers, the combination of the synthetic rubbers may be optionally selected unless the effects of the present invention are adversely influenced. Also, various properties of the resulting rubber composition such as a rolling resistance performance and a wear resistance may be appropriately controlled by selecting a suitable combination of the synthetic rubbers.

Meanwhile, the method for producing the rubber used as the rubber component (B) in the present invention is not particularly limited, and any commercially available product may also be used as the rubber.

The rubber composition preferably contains the above copolymer (A) in an amount of from 0.1 to 100 parts by mass, more preferably from 0.5 to 50 parts by mass and still more preferably from 1 to 30 parts by mass on the basis of 100 parts by mass of the above rubber component (B) from the viewpoint of enhancing a rolling resistance performance and a wear resistance of the rubber composition.

<Carbon Black (C)>

Examples of the carbon black (C) usable in the present invention include carbon blacks such as furnace black, channel black, thermal black, acetylene black and Ketjen black. Of these carbon blacks, from the viewpoints of a high curing rate and an improved mechanical strength of the rubber composition, preferred is furnace black.

Examples of commercially available products of the furnace black include "DIABLACK" available from Mitsubishi Chemical Corp., and "SEAST" available from Tokai Carbon Co., Ltd. Examples of commercially available products of the acetylene black include "DENKABLACK" available from Denki Kagaku Kogyo K.K. Examples of commercially available products of the Ketjen black include "ECP600JD" available from Lion Corp.

The carbon black (C) may be subjected to an acid treatment with nitric acid, sulfuric acid, hydrochloric acid or a mixed acid thereof or may be subjected to a heat treatment in the presence of air for conducting a surface oxidation treatment thereof, from the viewpoint of improving a wettability or a dispersibility of the carbon black (C) in the copolymer (A) and the rubber component (B). In addition, from the viewpoint of improving a mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbides (such as, for example, $B_4C$ and $B_6C$), boron nitride (such as BN) and other boron compounds.

The average particle size of the carbon black (C) may be controlled by pulverization or the like. In order to pulverize the carbon black (C), there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like.

The carbon black (C) preferably has an average particle size of from 5 to 100 nm and more preferably from 10 to 80 nm from the viewpoint of improving a dispersibility in the rubber composition and a mechanical strength of the rubber composition.

Meanwhile, the average particle size of the carbon black (C) may be determined by calculating an average value of diameters of carbon black particles measured using a transmission type electron microscope.

In the rubber composition of the present invention, the carbon black (C) is preferably compounded in an amount of from 0.1 to 150 pars by mass, more preferably from 2 to 150 parts by mass, still more preferably from 5 to 90 parts by mass and even still more preferably from 20 to 80 parts by mass on the basis of 100 parts by mass of the rubber component (B). When the amount of the carbon black (C) compounded falls within the above-specified range, the resulting rubber composition is not only excellent in mechanical strength, hardness and processability, but also exhibits a good dispersibility of the carbon black (C) therein.

<Silica (D)>

Examples of the silica (D) include wet silica (hydrous silicic acid), dry silica (anhydrous silicic acid), calcium silicate and aluminum silicate. Of these silicas, from the viewpoint of further enhancing a processability, a mechanical strength and a wear resistance of the resulting rubber composition, preferred is wet silica. These silicas may be used alone or in combination of any two or more thereof.

The silica (D) preferably has an average particle size of from 0.5 to 200 nm, more preferably from 5 to 150 nm, still more preferably from 10 to 100 nm and even still more preferably from 10 to 60 nm from the viewpoint of enhancing a processability, a rolling resistance performance, a mechanical strength and a wear resistance of the resulting rubber composition.

Meanwhile, the average particle size of the silica (D) may be determined by calculating an average value of diameters of silica particles measured using a transmission type electron microscope.

In the rubber composition of the present invention, the silica (D) is preferably compounded in an amount of from 0.1 to 150 pars by mass, more preferably from 0.5 to 130 parts by mass, still more preferably from 5 to 100 parts by mass and even still more preferably from 5 to 95 parts by mass on the basis of 100 parts by mass of the rubber component (B). When the amount of the silica (D) compounded falls within the above-specified range, the resulting rubber composition can be enhanced in processability, rolling resistance performance, mechanical strength and wear resistance.

The rubber composition according to the present invention more preferably contains the above copolymer (A), carbon black (C) and silica (D) in amounts of from 0.1 to 100 parts by mass, from 0.1 to 150 parts by mass and from 0.1 to 150 parts by mass, respectively, on the basis of 100 parts by mass of the above rubber component (B).

<Optional Components>

(Silane Coupling Reagent)

The rubber composition according to the present invention also preferably contains a silane coupling reagent. As the silane coupling reagent, there may be used a sulfide-based compound, a mercapto-based compound, a vinyl-based compound, an amino-based compound, a glycidoxy-based compound, a nitro-based compound, a chloro-based compound, etc.

Examples of the sulfide-based compound include bis(3-triethoxysilylpropyl)tetrasulfide, bis(2-triethoxysilylethyl) tetrasulfide, bis(3-trimethoxysilylpropyl)tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethyl thiocarbamoyl tetrasulfide, 3-triethoxysilylpropyl-N,N-dimethyl thiocarbamoyl tetrasulfide, 2-trimethoxysilylethyl-N, N-dimethyl thiocarbamoyl tetrasulfide, 3-trimethoxysilyl-propyl benzothiazole tetrasulfide, 3-triethoxysilylpropyl benzothiazole tetrasulfide, 3-triethoxysilylpropyl methacrylate monosulfide and 3-trimethoxysilylpropyl methacrylate monosulfide.

Examples of the mercapto-based compound include 3-mercaptopropyl trimethoxysilane, 3-mercaptopropyl triethoxysilane, 2-mercaptoethyl trimethoxysilane and 2-mercaptoethyl triethoxysilane.

Examples of the vinyl-based compound include vinyl triethoxysilane and vinyl trimethoxysilane.

Examples of the amino-based compound include 3-aminopropyl triethoxysilane, 3-aminopropyl trimethoxysilane, 3-(2-aminoethyl)aminopropyl triethoxysilane and 3-(2-aminoethyl)aminopropyl trimethoxysilane.

Examples of the glycidoxy-based compound include γ-glycidoxypropyl triethoxysilane, γ-glycidoxypropyl trimethoxysilane, γ-glycidoxypropyl methyl diethoxysilane and γ-glycidoxypropyl methyl dimethoxysilane.

Examples of the nitro-based compound include 3-nitropropyl trimethoxysilane and 3-nitropropyl triethoxysilane.

Examples of the chloro-based compound include 3-chloropropyl trimethoxysilane, 3-chloropropyl triethoxysilane, 2-chloroethyl trimethoxysilane and 2-chloroethyl triethoxysilane.

These silane coupling reagents may be used alone or in combination of any two or more thereof. Of these silane coupling gents, from the viewpoints of a large addition effect and low costs, preferred are bis(3-triethoxysilylpropyl)disulfide, bis(3-triethoxysilylpropyl)tetrasulfide and 3-mercaptopropyl trimethoxysilane.

The content of the silane coupling reagent in the rubber composition is preferably from 0.1 to 30 parts by mass, more preferably from 0.5 to 20 parts by mass and still more preferably from 1 to 15 parts by mass on the basis of 100 parts by mass of the silica (D). When the content of the silane coupling reagent in the rubber composition falls within the above-specified range, the resulting rubber composition can be enhanced in dispersibility, coupling effect, reinforcing property and wear resistance.

(Other Fillers)

For the purposes of enhancing a mechanical strength of the rubber composition, improving various properties such as a heat resistance and a weathering resistance thereof, controlling a hardness thereof, and further improving economy by adding an extender thereto, the rubber composition according to the present invention may further contain a filler other than the carbon black (C) and silica (D), if required.

The filler other than the carbon black (C) and silica (D) may be appropriately selected according to the applications of the obtained rubber composition. For example, as the filler, there may be used one or more fillers selected from the group consisting of organic fillers, and inorganic fillers such as clay, talc, mica, calcium carbonate, magnesium hydroxide, aluminum hydroxide, barium sulfate, titanium oxide, glass fibers, fibrous fillers and glass balloons. The content of the above filler in the rubber composition of the present invention, if compounded therein, is preferably from 0.1 to 120 parts by mass, more preferably from 5 to 90 parts by mass and still more preferably from 10 to 80 parts by mass on the basis of 100 parts by mass of the rubber component (B). When the content of the filler in the rubber composition falls within the above-specified range, the resulting rubber composition can be further improved in mechanical strength.

The rubber composition according to the present invention may also contain, if required, a softening reagent for the purpose of improving a processability, a flowability or the like of the resulting rubber composition unless the effects of the present invention are adversely influenced. Examples of the softening reagent include a process oil such as a silicone oil, an aroma oil, TDAE (treated distilled aromatic extracts), MES (mild extracted solvates), RAE (residual aromatic extracts), a paraffin oil and a naphthene oil; a resin component such as aliphatic hydrocarbon resins, alicyclic hydrocarbon resins, C9-based resins, rosin-based resins, coumarone-indene-based resins and phenol-based resins; and a liquid polymer such as a low-molecular weight polybutadiene, a low-molecular weight polyisoprene, a low-molecular weight styrene-butadiene copolymer and a low-molecular weight styrene-isoprene copolymer. Meanwhile, the above copolymers may be in the form of either a block copolymer or a random copolymer. The liquid polymer preferably has a weight-average molecular weight of from 500 to 100,000 from the viewpoint of a good processability of the resulting rubber composition. The above process oil, resin component or liquid polymer as a softening reagent is preferably compounded in the rubber composition of the present invention in an amount of less than 50 parts by mass on the basis of 100 parts by mass of the rubber component (B).

The rubber composition according to the present invention may also contain a homopolymer of β-farnesene unless the effects of the present invention are adversely influenced. The content of the homopolymer of β-farnesene in the rubber composition, if compounded therein, is preferably less than 50 parts by mass on the basis of 100 parts by mass of the rubber component (B).

The rubber composition according to the present invention may also contain, if required, one or more additives selected from the group consisting of an antioxidant, an oxidation inhibitor, a wax, a lubricant, a light stabilizer, a scorch retarder, a processing aid, a colorant such as pigments and coloring matters, a flame retardant, an antistatic reagent, a delustering reagent, an anti-blocking reagent, an ultraviolet absorber, a release reagent, a foaming reagent, an antimicrobial reagent, a mildew-proofing reagent and a perfume, for the purposes of improving a weathering resistance, a heat resistance, an oxidation resistance or the like of the resulting rubber composition, unless the effects of the present invention are adversely influenced.

Examples of the oxidation inhibitor include hindered phenol-based compounds, phosphorus-based compounds, lactone-based compounds and hydroxyl-based compounds. Examples of the antioxidant include amine-ketone-based compounds, imidazole-based compounds, amine-based compounds, phenol-based compounds, sulfur-based compounds and phosphorus-based compounds.

The rubber composition of the present invention is preferably used in the from of a crosslinked product produced by adding a crosslinking reagent thereto. Examples of the crosslinking reagent include sulfur and sulfur compounds, oxygen, organic peroxides, phenol resins and amino resins, quinone and quinone dioxime derivatives, halogen compounds, aldehyde compounds, alcohol compounds, epoxy compounds, metal halides and organic metal halides, and silane compounds. Among these crosslinking reagents, preferred are sulfur and sulfur compounds. These crosslinking reagents may be used alone or in combination of any two or more thereof. The crosslinking reagent is preferably compounded in the rubber composition in an amount of from 0.1 to 10 parts by mass on the basis of 100 parts by mass of the rubber component (B).

When using sulfur as the crosslinking reagent, a vulcanization aid or a vulcanization accelerator is preferably used in combination with the crosslinking reagent.

Examples of the vulcanization aid include fatty acids such as stearic acid and metal oxides such as zinc oxide.

Examples of the vulcanization accelerator include guanidine-based compounds, sulfene amide-based compounds, thiazole-based compounds, thiuram-based compounds, thiourea-based compounds, dithiocarbamic acid-based compounds, aldehyde-amine-based compounds or aldehyde-ammonia-based compounds, imidazoline-based compounds and xanthate-based compounds. These vulcanization aids or vulcanization accelerators may be used alone or in combination of any two or more thereof. The vulcanization aid or vulcanization accelerator is preferably compounded in the rubber composition of the present invention in an amount of from 0.1 to 15 parts by mass on the basis of 100 parts by mass of the rubber component (B).

The method for producing the rubber composition of the present invention is not particularly limited, and any suitable method may be used in the present invention as long as the respective components are uniformly mixed with each other. The method of uniformly mixing the respective components may be carried out, for example, using a closed type kneader of a contact type or a meshing type such a kneader rudder, a Brabender, a Banbury mixer and an internal mixer, a single-screw extruder, a twin-screw extruder, a mixing roll, a roller or the like in a temperature range of usually from 70 to 270° C.

[Tire]

The tire according to the present invention is produced by using the rubber composition according to the present invention at least as a part thereof, and therefore can exhibit a good mechanical strength and an excellent rolling resistance performance.

EXAMPLES

The present invention will be described in more detail below by referring to the following examples. It should be noted, however, that the following examples are only illustrative and not intended to limit the invention thereto.

The respective components used in the following Examples and Comparative Examples are as follows.
Copolymer (A):
 Copolymers (A-1) to (A-4) obtained in Production Examples 1 to 4, respectively.
Rubber Component (B):
 Natural rubber "STR20" (natural rubber from Thailand)

Styrene-butadiene rubber "JSR1500" (available from JSR Corp.)
Butadiene rubber "BR-01" (available from JSR Corp.)
Weight-average molecular weight=550,000
Cis isomer content=95% by mass
Carbon Black (C-1):
"DIABLACK H" available from Mitsubishi Chemical Corp.; average particle size: 30 nm
Carbon Black (C-2):
"DIABLACK I" available from Mitsubishi Chemical Corp.; average particle size: 20 nm
Carbon Black (C-3):
"SEAST V" available from Tokai Carbon Co., Ltd.; average particle size: 60 nm
Silica (D-1):
"ULTRASIL7000GR" available from Evonik Degussa Japan Co., Ltd.; wet silica; average particle size: 14 nm
Silica (D-2):
"AEROSIL 300" available from Nippon Aerosil Co., Ltd.; dry silica; average particle size: 7 nm
Silica (D-3):
"NIPSIL E-74P" available from Tosoh Silica Corporation; wet silica; average particle size: 74 nm
Polyisoprene
Polyisoprene obtained in Production Example 5
Homopolymer of β-farnesene:
Homopolymer of β-farnesene obtained in Production Example 6
TDAE:
"VivaTec500" available from H & R Corp.
Silane Coupling Reagent:
"Si75" (available from Evonik Degussa Japan Co., Ltd.)
Stearic Acid:
"LUNAC S-20" (available from Kao Corp.)
Zinc Oxide:
Zinc oxide (available from Sakai Chemical Industry Co., Ltd.)
Antioxidant (1):
"NOCRAC 6C" (available from Ouchi Shinko Chemical Industrial Co., Ltd.)
Antioxidant (2):
"ANTAGE RD" (available from Kawaguchi Chemical Industry Co., Ltd.)
Sulfur:
Sulfur fine powder 200 mesh (available from Tsurumi Chemical Industry Co., Ltd.)
Vulcanization Accelerator (1):
"NOCCELER NS" (available from Ouchi Shinko Chemical Industrial Co., Ltd.)
Vulcanization Accelerator (2):
"NOCCELER CZ-G" (available from Ouchi Shinko Chemical Industrial Co., Ltd.)
Vulcanization Accelerator (3):
"NOCCELER D" (available from Ouchi Shinko Chemical Industrial Co., Ltd.)
Vulcanization Accelerator (4):
"NOCCELER TBT-N" (available from Ouchi Shinko Chemical Industrial Co., Ltd.)

Production Example 1: Production of β-Farnesene/Isoprene Random Copolymer (A-1)

A pressure reaction vessel previously purged with nitrogen and then dried was charged with 1490 g of cyclohexane as a solvent and 12.4 g of sec-butyl lithium (in the form of a 10.5% by mass cyclohexane solution) as an initiator. The contents of the reaction vessel were heated to 50° C., and 1500 g of a mixture of isoprene (a) and β-farnesene (b) (which was previously prepared by mixing 300 g of isoprene (a) and 1200 g of β-farnesene (b) in a cylinder) was added thereto at a rate of 10 mL/min, and the mixture was polymerized for 1 h. The resulting polymerization reaction solution was treated with methanol and then washed with water. After separating water from the thus washed polymerization reaction solution, the resulting solution was dried at 70° C. for 12 h, thereby obtaining a β-farnesene/isoprene random copolymer (A-1). Various properties of the thus obtained β-farnesene/isoprene random copolymer (A-1) are shown in Table 1.

Production Example 2: Production of β-Farnesene/Isoprene Random Copolymer (A-2)

A pressure reaction vessel previously purged with nitrogen and then dried was charged with 1790 g of cyclohexane as a solvent and 10.9 g of sec-butyl lithium (in the form of a 10.5% by mass cyclohexane solution) as an initiator. The contents of the reaction vessel were heated to 50° C., and 1200 g of a mixture of isoprene (a) and β-farnesene (b) (which was previously prepared by mixing 480 g of isoprene (a) and 720 g of β-farnesene (b) in a cylinder) was added thereto at a rate of 10 mL/min, and the mixture was polymerized for 1 h. The resulting polymerization reaction solution was treated with methanol and then washed with water. After separating water from the thus washed polymerization reaction solution, the resulting solution was dried at 70° C. for 12 h, thereby obtaining a β-farnesene/isoprene random copolymer (A-2). Various properties of the thus obtained β-farnesene/isoprene random copolymer (A-2) are shown in Table 1.

Production Example 3: Production of β-Farnesene/Isoprene Block Copolymer (A-3)

A pressure reaction vessel previously purged with nitrogen and then dried was charged with 2090 g of cyclohexane as a solvent and 8.2 g of sec-butyl lithium (in the form of a 10.5% by mass cyclohexane solution) as an initiator. The contents of the reaction vessel were heated to 50° C., and 360 g of isoprene (a) was added thereto at a rate of 10 mL/min, and the mixture was polymerized for 1 h. Successively, 540 g of β-farnesene (b) was added to the polymerization reaction solution at a rate of 10 mL/min, and the mixture was further polymerized for 1 h. The resulting polymerization reaction solution was treated with methanol and then washed with water. After separating water from the thus washed polymerization reaction solution, the resulting solution was dried at 70° C. for 12 h, thereby obtaining a β-farnesene/isoprene block copolymer (A-3). Various properties of the thus obtained β-farnesene/isoprene block copolymer (A-3) are shown in Table 1.

Production Example 4: Production of β-Farnesene/Isoprene/β-Farnesene Block Copolymer (A-4)

A pressure reaction vessel previously purged with nitrogen and then dried was charged with 1670 g of cyclohexane as a solvent and 10.2 g of sec-butyl lithium (in the form of a 10.5% by mass cyclohexane solution) as an initiator. The contents of the reaction vessel were heated to 50° C., and 336 g of β-farnesene (b) was added thereto at a rate of 10 mL/min, and the mixture was polymerized for 1 h. Successively, 448 g of isoprene (a) was added to the polymerization reaction solution at a rate of 10 mL/min, and the mixture was further polymerized for 1 h. Successively, 336 g of β-farnesene (b) was added to the polymerization reaction solution at a rate of 10 mL/min, and the mixture was further polymerized for 1 h. The resulting polymerization reaction solution was treated with methanol and then washed with water. After separating water from the thus washed polymerization reaction solution, the resulting solution was dried at 70° C. for 12 h, thereby obtaining a β-farnesene/isoprene/β-farnesene block copolymer (A-4). Various properties of the thus obtained β-farnesene/isoprene/β-farnesene block copolymer (A-4) are shown in Table 1.

Production Example 5: Production of Polyisoprene

A pressure reaction vessel previously purged with nitrogen and then dried was charged with 600 g of hexane and 44.9 g of n-butyl lithium (in the form of a 17% by mass hexane solution). The contents of the reaction vessel were heated to 70° C., and 2050 g of isoprene was added thereto, and the mixture was polymerized for 1 h. The resulting polymerization reaction solution was mixed with methanol and then washed with water. After separating water from the thus washed polymerization reaction solution, the resulting solution was dried at 70° C. for 12 h, thereby obtaining a polyisoprene having properties as shown in Table 1.

Production Example 6: Production of Homopolymer of β-Farnesene

A pressure reaction vessel previously purged with nitrogen and then dried was charged with 274 g of hexane as a solvent and 1.2 g of n-butyl lithium (in the form of a 17% by mass hexane solution) as an initiator. The contents of the reaction vessel were heated to 50° C., and 272 g of β-farnesene was added thereto, and the mixture was polymerized for 1 h. Successively, the resulting polymerization reaction solution was treated with methanol and then washed with water. After separating water from the thus washed polymerization reaction solution, the resulting solution was dried at 70° C. for 12 h, thereby obtaining a homopolymer of β-farnesene. Various properties of the thus obtained homopolymer of β-farnesene are shown in Table 1.

Meanwhile, the weight-average molecular weight and melt viscosity of each of the copolymer (A), polyisoprene and homopolymer of β-farnesene were measured by the following methods.

(Method of Measuring Weight-Average Molecular Weight)

The weight-average molecular weight (Mw) and the molecular weight distribution (Mw/Mn) of each of the copolymer (A), polyisoprene and homopolymer of β-farnesene were measured by GPC (gel permeation chromatography) in terms of a molecular weight of polystyrene as a reference standard substance. The measuring devices and conditions are as follows.
  Apparatus: GPC device "GPC8020" available from Tosoh Corp.
  Separating column: "TSKgelG4000HXL" available from Tosoh Corp.
  Detector: "RI-8020" available from Tosoh Corp.
  Eluent: Tetrahydrofuran
  Eluent flow rate: 1.0 mL/min
  Sample concentration: 5 mg/10 mL
  Column temperature: 40° C.

(Method of Measuring Melt Viscosity)

The melt viscosity of each of the copolymer (A), polyisoprene and homopolymer of β-farnesene was measured at 38° C. using a B-type viscometer available from Brookfield Engineering Labs. Inc.

TABLE 1

|  | Polymer | Polymerization form | (a)/{(a) + (b)} (mass %) | Weight-average molecular weight (×10³) | Molecular weight distribution Mw/Mn | Melt viscosity (at 38° C.) (Pa · s) |
|---|---|---|---|---|---|---|
| Production Example 1 | Copolymer (A-1) | Random | 20 | 101 | 1.1 | 88 |
| Production Example 2 | Copolymer (A-2) | Random | 40 | 98 | 1.05 | 232 |
| Production Example 3 | Copolymer (A-3) | Block | 40 | 99 | 1.02 | 258 |
| Production Example 4 | Copolymer (A-4) | Block | 40 | 96 | 1.06 | 293 |
| Production Example 5 | Polyisoprene | — | — | 32 | 1.1 | 74 |
| Production Example 6 | Homopolymer of β-farnesene | — | — | 140 | 1.1 | 65 |

Examples 1 to 13 and Comparative Examples 1 to 8

The copolymer (A), rubber component (B), carbon black (C), silica (D), silane coupling reagent, polyisoprene, TDAE, stearic acid, zinc oxide and antioxidant were charged at respective compounding ratios as shown in Tables 2 to 4 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the following method.

In addition, the resulting rubber composition was press-molded (at 145° C. for 20 to 60 min) to prepare a sheet (thickness: 2 mm). The thus prepared sheet was evaluated for a tensile strength at break, DIN abrasion loss and a rolling resistance performance by the following methods. The results are shown in Tables 2 to 4.

(1) Mooney Viscosity

As an index of a processability of the rubber composition, the Mooney viscosity (ML1+4) of the rubber composition before being cured was measured at 100° C. according to JIS K 6300. The values of the respective Examples and Comparative Examples shown in Table 2 are relative values based on 100 as the value of Comparative Example 3. The values of the respective Examples and Comparative Examples shown in Table 3 are relative values based on 100 as the value of Comparative Example 6. The values of the respective Examples and Comparative Examples shown in Table 4 are relative values based on 100 as the value of Comparative Example 8. Meanwhile, the smaller Mooney viscosity value indicates a more excellent processability.

(2) Tensile Strength at Break

A sheet prepared from the rubber composition produced in the respective Examples and Comparative Examples was punched into a JIS No. 3 dumbbell-shaped test piece, and the obtained test piece was subjected to measurement of a tensile strength at break thereof using a tensile tester available from Instron Corp., according to JIS K 6251. The values of the respective Examples and Comparative Examples shown in Table 2 are relative values based on 100 as the value of Comparative Example 3. The values of the respective Examples and Comparative Examples shown in Table 3 are relative values based on 100 as the value of Comparative Example 6. The values of the respective Examples and Comparative Examples shown in Table 4 are relative values based on 100 as the value of Comparative Example 8. Meanwhile, the larger value indicates a better tensile strength at break of the rubber composition.

(3) DIN Abrasion Loss

The rubber composition was measured for DIN abrasion loss under a load of 10 N at an abrasion distance of 40 m according to JIS K 6264. The values of the respective Examples and Comparative Examples shown in Table 2 are relative values based on 100 as the value of Comparative Example 3. The values of the respective Examples and Comparative Examples shown in Table 3 are relative values based on 100 as the value of Comparative Example 6. The values of the respective Examples and Comparative Examples shown in Table 4 are relative values based on 100 as the value of Comparative Example 8. Meanwhile, the smaller value indicates a less abrasion loss of the rubber composition.

(4) Rolling Resistance Performance

A sheet prepared from the rubber composition produced in the respective Examples and Comparative Examples was cut into a test piece having a size of 40 mm in length=7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static strain of 10% and a dynamic strain of 2%. The values of the respective Examples and Comparative Examples shown in Table 2 are relative values based on 100 as the value of Comparative Example 3. The values of the respective Examples and Comparative Examples shown in Table 3 are relative values based on 100 as the value of Comparative Example 6. The values of the respective Examples and Comparative Examples shown in Table 4 are relative values based on 100 as the value of Comparative Example 8. Meanwhile, the smaller value indicates an excellent rolling resistance performance of the rubber composition.

TABLE 2

|  | Examples | | | | Comparative Examples | | |
| --- | --- | --- | --- | --- | --- | --- | --- |
|  | 1 | 2 | 3 | 4 | 1 | 2 | 3 |
| Composition (part(s) by mass) | | | | | | | |
| Component (A) | | | | | | | |
| Copolymer (A-1) | 10 | | | | | | |
| Copolymer (A-2) |  | 10 | | | | | |
| Copolymer (A-3) |  |  | 10 | | | | |
| Copolymer (A-4) |  |  |  | 10 | | | |
| Polyisoprene |  |  |  |  | 10 | | |
| TDAE |  |  |  |  |  |  | 10 |
| Component (B) | | | | | | | |
| Natural rubber | 100 | 100 | 100 | 100 | 100 | 100 | 100 |
| Component (C) | | | | | | | |
| Carbon black (C-1) | 50 | 50 | 50 | 50 | 50 | 50 | 50 |
| Optional Components | | | | | | | |
| Stearic acid | 2 | 2 | 2 | 2 | 2 | 2 | 2 |
| Silane coupling reagent | 4 | 4 | 4 | 4 | 4 | 4 | 4 |
| Zinc oxide | 3.5 | 3.5 | 3.5 | 3.5 | 3.5 | 3.5 | 3.5 |
| Antioxidant (1) | 1 | 1 | 1 | 1 | 1 | 1 | 1 |
| Sulfur | 1.5 | 1.5 | 1.5 | 1.5 | 1.5 | 1.5 | 1.5 |
| Vulcanization accelerator (1) | 1 | 1 | 1 | 1 | 1 | 1 | 1 |
| Properties | | | | | | | |
| Mooney viscosity (relative value) | 75 | 76 | 78 | 78 | 81 | 75 | 100 |
| Tensile strength at break (relative value) | 92 | 93 | 93 | 96 | 92 | 89 | 100 |
| DIN abrasion loss (relative value) | 107 | 107 | 101 | 104 | 107 | 114 | 100 |
| Rolling resistance performance (at 60° C.; tanδ) (relative value) | 99 | 103 | 103 | 95 | 110 | 119 | 100 |

The rubber compositions obtained in Examples 1 to 4 exhibited a low Mooney viscosity as compared to that of Comparative Example 3 and therefore a good processability. Furthermore, the rubber compositions obtained in Examples 1 to 4 were excellent in rolling resistance performance as compared to those of Comparative Examples 1 and 2, and were also prevented from being deteriorated in mechanical strength and wear resistance.

compared to that of Comparative Example 4, and were also prevented from being deteriorated in mechanical strength and wear resistance.

From the comparison between Example 9 and Comparative Example 5, it was confirmed that when controlling an average particle size of the carbon black (C) to the range of from 5 to 100 nm and an average particle size of the silica

TABLE 3

|  | Examples | | | | | Comparative Examples | | |
|---|---|---|---|---|---|---|---|---|
|  | 5 | 6 | 7 | 8 | 9 | 4 | 5 | 6 |
| Composition (part(s) by mass) | | | | | | | | |
| Component (A) | | | | | | | | |
| Copolymer (A-1) | 10 | | | | | | | |
| Copolymer (A-2) | | 10 | | | 10 | | | |
| Copolymer (A-3) | | | 10 | | | | | |
| Copolymer (A-4) | | | | 10 | | | | |
| Polyisoprene | | | | | | 10 | 10 | |
| Component (B) | | | | | | | | |
| Styrene-butadiene rubber | 100 | 100 | 100 | 100 | 100 | 100 | 100 | 100 |
| Component (C) | | | | | | | | |
| Carbon black (C-1) | 25 | 25 | 25 | 25 | | 25 | | 25 |
| Carbon black (C-3) | | | | | 5 | | 5 | |
| Component (D) | | | | | | | | |
| Silica (D-1) | 25 | 25 | 25 | 25 | 40 | 25 | 40 | 25 |
| Silica (D-2) | | | | | 10 | | 10 | |
| Optional Components | | | | | | | | |
| Silane coupling reagent | 2 | 2 | 2 | 2 | 4 | 2 | 4 | 2 |
| Stearic acid | 1 | 1 | 1 | 1 | 1 | 1 | 1 | 1 |
| Zinc oxide | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 |
| Antioxidant (2) | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator (2) | 0.4 | 0.4 | 0.4 | 0.4 | 0.35 | 0.4 | 0.35 | 0.4 |
| Vulcanization accelerator (3) | 0.3 | 0.3 | 0.3 | 0.3 | 0.5 | 0.3 | 0.5 | 0.3 |
| Vulcanization accelerator (4) | 1.2 | 1.2 | 1.2 | 1.2 | 1.5 | 1.2 | 1.5 | 1.2 |
| Properties | | | | | | | | |
| Mooney viscosity (relative value) | 77 | 76 | 79 | 77 | 88 | 77 | 87 | 100 |
| Tensile strength at break (relative value) | 90 | 98 | 90 | 95 | 81 | 90 | 80 | 100 |
| DIN abrasion loss (relative value) | 110 | 107 | 105 | 105 | 114 | 114 | 114 | 100 |
| Rolling resistance performance (at 60° C.; tan δ) (relative value) | 100 | 101 | 101 | 101 | 96 | 104 | 100 | 100 |

The rubber compositions obtained in Examples 5 to 8 exhibited a low Mooney viscosity as compared to that of Comparative Example 6 and therefore a good processability. Furthermore, the rubber compositions obtained in Examples 5 to 8 were excellent in rolling resistance performance as (D) to the range of from 0.5 to 200 nm, the resulting rubber composition exhibited a good processability, was prevented from being deteriorated in mechanical strength and wear resistance, and was excellent in rolling resistance performance.

TABLE 4

|  | Examples | | | | Comparative Examples | |
|---|---|---|---|---|---|---|
|  | 10 | 11 | 12 | 13 | 7 | 8 |
| Composition (part(s) by mass) | | | | | | |
| Component (A) | | | | | | |
| Copolymer (A-1) | 10 | | | | | |
| Copolymer (A-2) | | 10 | | | | |
| Copolymer (A-3) | | | 10 | | | |

TABLE 4-continued

|  | Examples | | | | Comparative Examples | |
| --- | --- | --- | --- | --- | --- | --- |
|  | 10 | 11 | 12 | 13 | 7 | 8 |
| Copolymer (A-4) |  |  |  | 10 |  |  |
| Polyisoprene |  |  |  |  | 10 |  |
| Component (B) |  |  |  |  |  |  |
| Styrene-butadiene rubber | 100 | 100 | 100 | 100 | 100 | 100 |
| Component (D) |  |  |  |  |  |  |
| Silica (D-1) | 50 | 50 | 50 | 50 | 50 | 50 |
| Optional Components |  |  |  |  |  |  |
| Silane coupling reagent | 4 | 4 | 4 | 4 | 4 | 4 |
| Stearic acid | 1 | 1 | 1 | 1 | 1 | 1 |
| Zinc oxide | 3.5 | 3.5 | 3.5 | 3.5 | 3.5 | 3.5 |
| Antioxidant (1) | 1 | 1 | 1 | 1 | 1 | 1 |
| Antioxidant (2) | 1 | 1 | 1 | 1 | 1 | 1 |
| Sulfur | 1.5 | 1.5 | 1.5 | 1.5 | 1.5 | 1.5 |
| Vulcanization accelerator (2) | 0.35 | 0.35 | 0.35 | 0.35 | 0.35 | 0.35 |
| Vulcanization accelerator (3) | 0.5 | 0.5 | 0.5 | 0.5 | 0.5 | 0.5 |
| Vulcanization accelerator (4) | 1.5 | 1.5 | 1.5 | 1.5 | 1.5 | 1.5 |
| Properties |  |  |  |  |  |  |
| Mooney viscosity (relative value) | 88 | 90 | 89 | 90 | 87 | 100 |
| Tensile strength at break (relative value) | 80 | 81 | 87 | 80 | 80 | 100 |
| DIN abrasion loss (relative value) | 118 | 117 | 118 | 116 | 118 | 100 |
| Rolling resistance performance (at 60° C.; tanδ) (relative value) | 99 | 98 | 98 | 98 | 104 | 100 |

The rubber compositions obtained in Examples 10 to 13 exhibited a low Mooney viscosity as compared to that of Comparative Example 8 and therefore a good processability. Furthermore, the rubber compositions obtained in Examples 10 to 13 were excellent in rolling resistance performance as compared to that of Comparative Example 7, and were also prevented from being deteriorated in mechanical strength and wear resistance.

Examples 14 to 20 and Comparative Examples 9 to 14

The copolymer (A), rubber component (B), carbon black (C), silica (D), homopolymer of β-farnesene, polyisoprene, silane coupling reagent, TDAE, stearic acid, zinc oxide and antioxidant were charged at respective compounding ratios as shown in Tables 5 and 6 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator thereto, the contents of the mixing roll were kneaded at 60° C. for 6 min, thereby obtaining a rubber composition. The Mooney viscosity of the thus obtained rubber composition was measured by the above method.

In addition, the resulting rubber composition was press-molded (at 145° C. for 25 to 50 min) to prepare a sheet (thickness: 2 mm). The thus prepared sheet was evaluated for a tensile strength at break and a rolling resistance performance by the above methods. The results are shown in Tables 5 and 6.

Furthermore, the rubber compositions obtained in Examples 14 to 19 and Comparative Examples 9 to 13 were measured for DIN abrasion loss thereof by the above method. The results are shown in Table 5.

Meanwhile, the values of the Mooney viscosity, tensile strength at break, DIN abrasion loss and rolling resistance performance of the respective rubber compositions as shown in Table 5 are relative values based on 100 as each of those values of Comparative Example 13.

Also, the values of the Mooney viscosity, tensile strength at break and rolling resistance performance of the respective rubber compositions as shown in Table 6 are relative values based on 100 as each of those values of Comparative Example 14.

TABLE 5

|  | Examples | | | | | | Comparative Examples | | | | |
| --- | --- | --- | --- | --- | --- | --- | --- | --- | --- | --- | --- |
|  | 14 | 15 | 16 | 17 | 18 | 19 | 9 | 10 | 11 | 12 | 13 |
| Composition (part(s) by mass) | | | | | | | | | | | |
| Component (A) | | | | | | | | | | | |
| Copolymer (A-2) | 1 | 10 | 6 | 6 | 6 | 30 |  |  |  |  |  |
| Homopolymer of β-farnesene |  |  | 4 |  |  |  |  |  |  |  |  |
| Polyisoprene |  |  |  | 4 |  |  | 1 | 10 |  | 30 |  |
| TDAE |  |  |  |  | 4 |  |  |  | 10 |  |  |

TABLE 5-continued

|  | Examples | | | | | | Comparative Examples | | | | |
| --- | --- | --- | --- | --- | --- | --- | --- | --- | --- | --- | --- |
|  | 14 | 15 | 16 | 17 | 18 | 19 | 9 | 10 | 11 | 12 | 13 |
| Component (B) | | | | | | | | | | | |
| Natural rubber | 100 | 100 | 100 | 100 | 100 | 80 | 100 | 100 | 100 | 80 | 100 |
| Styrene-butadiene rubber | | | | | | | | | | | |
| Butadiene rubber | | | | | | 20 | | | | 20 | |
| Component (C) | | | | | | | | | | | |
| Carbon black (C-2) | 45 | 45 | 45 | 45 | 45 | 70 | 45 | 45 | 45 | 70 | 45 |
| Carbon black (C-3) | | | | | | 10 | | | | 10 | |
| Component (D) | | | | | | | | | | | |
| Silica (D-1) | | | | | | | | | | | |
| Silica (D-3) | | | | | | 5 | | | | 5 | |
| Silane coupling reagent | | | | | | 0.4 | | | | 0.4 | |
| Optional Components | | | | | | | | | | | |
| Stearic acid | 2 | 2 | 2 | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 | 1 | 1 | 1 |
| Antioxidant (2) | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 |
| Vulcanization accelerator (1) | 1.2 | 1.2 | 1.2 | 1.2 | 1.2 | 1.2 | 1.2 | 1.2 | 1.2 | 1.2 | 1.2 |
| Properties | | | | | | | | | | | |
| Mooney viscosity (relative value) | 99 | 78 | 77 | 78 | 78 | 85 | 100 | 81 | 76 | 89 | 100 |
| Tensile strength at break (relative value) | 99 | 96 | 95 | 97 | 95 | 74 | 97 | 94 | 89 | 74 | 100 |
| DIN abrasion loss (relative value) | 100 | 108 | 109 | 106 | 108 | 113 | 100 | 109 | 112 | 113 | 100 |
| Rolling resistance performance (at 60° C.; tanδ) (relative value) | 99 | 97 | 87 | 100 | 101 | 141 | 104 | 103 | 106 | 147 | 100 |

From the comparison between Example 14 and Comparative Example 9, it was confirmed that when controlling the amount of the copolymer (A) compounded in the rubber composition to the range of from 0.1 to 100 parts by mass based on 100 parts by mass of the rubber component (B), the resulting rubber composition exhibited a good processability, was prevented from being deteriorated in mechanical strength and wear resistance, and was excellent in rolling resistance performance.

The rubber compositions obtained in Examples 15 to 18 exhibited a low Mooney viscosity as compared to that of Comparative Example 13 and therefore was improved in processability. Furthermore, the rubber compositions obtained in Examples 15 to 18 had a tensile strength at break and a wear resistance which were almost similar to those of Comparative Example 10 or 11, but were excellent in rolling resistance performance as compared to that of Comparative Example 10 or 11, and therefore could be suitably used as a rubber composition for tires.

The rubber composition obtained in Example 19 exhibited a low Mooney viscosity as compared to that of Comparative Example 13 and therefore was improved in processability. Furthermore, the rubber composition obtained in Example 19 had a tensile strength at break and a wear resistance which were almost similar to those of Comparative Example 12, but was excellent in rolling resistance performance as compared to that of Comparative Example 12, and therefore could be suitably used as a rubber composition for tires.

From the comparison between Example 19 and Comparative Example 12, it was confirmed that when the silica (D) was compounded in an amount of from 0.1 to 150 parts by mass on the basis of 100 parts by mass of the rubber component (B), the effects of the present invention could be well exhibited.

From the comparison between Example 19 and Comparative Example 12, it was confirmed that when the carbon black (C) was compounded in an amount of from 0.1 to 150 parts by mass on the basis of 100 parts by mass of the rubber component (B), the effects of the present invention could be well exhibited.

From the comparison between Example 19 and Comparative Example 12, it was confirmed that when the average particle sizes of the carbon black (C) and the silica (D) were controlled to the range of from 5 to 100 nm and from 0.5 to 200 nm, respectively, the resulting rubber composition exhibited a good processability, was prevented from being deteriorated in mechanical strength, and was excellent in rolling resistance performance and wear resistance.

From the comparison between Example 19 and Comparative Example 12, it was confirmed that even when using two or more kinds of rubbers including the natural rubber and the synthetic rubber, the effects of the present invention could be well exhibited.

From the comparison between Examples 16 to 18 and Comparative Example 10 or 11, it was confirmed that even when using the copolymer (A) in combination with the other components, the effects of the present invention could be well exhibited.

TABLE 6

|  | Example 20 | Comparative Example 14 |
| --- | --- | --- |
| Composition (part(s) by mass) | | |
| Component (A) | | |
| Copolymer (A-2) | 50 | |
| Homopolymer of β-farnesene | | |
| Polyisoprene | | 50 |
| TDAE | | |

TABLE 6-continued

|  | Example 20 | Comparative Example 14 |
|---|---|---|
| Component (B) |  |  |
| Natural rubber | 100 | 100 |
| Styrene-butadiene rubber |  |  |
| Butadiene rubber |  |  |
| Component (C) |  |  |
| Carbon black (C-2) | 10 | 10 |
| Carbon black (C-3) |  |  |
| Component (D) |  |  |
| Silica (D-1) | 90 | 90 |
| Silica (D-3) |  |  |
| Silane coupling reagent | 7.2 | 7.2 |
| Optional Components |  |  |
| Stearic acid | 2 | 2 |
| Zinc oxide | 3.5 | 3.5 |
| Antioxidant (1) | 1 | 1 |
| Antioxidant (2) | 1 | 1 |
| Sulfur | 1.5 | 1.5 |
| Vulcanization accelerator (1) | 1.2 | 1.2 |
| Properties |  |  |
| Mooney viscosity (relative value) | 94 | 100 |
| Tensile strength at break (relative value) | 115 | 100 |
| Rolling resistance performance (at 60° C.; tanδ) (relative value) | 83 | 100 |

From the comparison between Example 20 and Comparative Example 14, it was confirmed that when the copolymer (A) was compounded in an amount of from 0.1 to 100 parts by mass on the basis of 100 parts by mass of the rubber component (B), the resulting rubber composition exhibited a good processability, and was excellent in rolling resistance performance without deterioration in mechanical strength and wear resistance.

From the comparison between Example 20 and Comparative Example 14, it was confirmed that when the silica (D) was compounded in an amount of from 0.1 to 150 parts by mass on the basis of 100 parts by mass of the rubber component (B), the effects of the present invention could be well exhibited.

The invention claimed is:

1. A copolymer, comprising:
a monomer unit (a) derived from isoprene, and
a monomer unit (b) derived from farnesene,
wherein said copolymer has a melt viscosity at 38° C. of from 1.5 to 800 Pa·s.

2. The copolymer according to claim 1, wherein the monomer unit (b) is a monomer unit derived from β-farnesene.

3. The copolymer according to claim 1, wherein a mass ratio of the monomer unit (a) to a sum of the monomer unit (a) and the monomer unit (b) in the copolymer is from 1 to 99% by mass.

4. The copolymer according to claim 1, wherein the copolymer has a molecular weight distribution Mw/Mn of from 1.0 to 4.0.

5. The copolymer according to claim 1, wherein the copolymer has a weight average molecular weight Mw of from 2,000 to 500,000.

6. The copolymer according to claim 1, wherein the copolymer is produced by a process comprising conducting an anionic polymerization in the presence of an organic metal initiator.

7. A process for producing the copolymer according to claim 1, the process comprising: copolymerizing isoprene with farnesene.

8. A rubber composition, comprising (A) the copolymer according to claim 1; (B) a rubber component; and (C) carbon black.

9. The rubber composition according to claim 8, wherein the carbon black (C) has an average particle size of from 5 to 100 nm.

10. The rubber composition according to claim 8, wherein contents of the copolymer (A) and the carbon black (C) in the rubber composition are from 0.1 to 100 parts by mass and from 0.1 to 150 parts by mass, respectively, on the basis of 100 parts by mass of the rubber component (B).

11. The rubber composition according to claim 8, wherein the rubber component (B) is at least one rubber selected from the group consisting of a styrene-butadiene rubber, a natural rubber, a butadiene rubber and an isoprene rubber.

12. A tire, comprising the rubber composition according to claim 8.

13. A rubber composition, comprising (A) the copolymer according to claim 1; (B) a rubber component; and (D) silica.

14. The rubber composition according to claim 13, wherein the silica (D) has an average particle size of from 0.5 to 200 nm.

15. The rubber composition according to claim 13, wherein contents of the copolymer (A) and the silica (D) in the rubber composition are from 0.1 to 100 parts by mass and from 0.1 to 150 parts by mass, respectively, on the basis of 100 parts by mass of the rubber component (B).

16. The rubber composition according to claim 13, wherein the rubber component (B) is at least one rubber selected from the group consisting of a styrene-butadiene rubber, a natural rubber, a butadiene rubber and an isoprene rubber.

17. A tire, comprising the rubber composition according to claim 13.

18. A rubber composition, comprising (A) the copolymer according to claim 1; (B) a rubber component; (C) carbon black; and (D) silica.

19. The rubber composition according to claim 18, wherein contents of the copolymer (A), the carbon black (C) and the silica (D) in the rubber composition are from 0.1 to 100 parts by mass, from 0.1 to 150 parts by mass and from 0.1 to 150 parts by mass, respectively, on the basis of 100 parts by mass of the rubber component (B).

20. The copolymer according to claim 1, wherein a mass ratio of the monomer unit (a) to a sum of the monomer unit (a) and the monomer unit (b) in the copolymer is from 10 to 80% by mass.

21. The copolymer according to claim 1, wherein a mass ratio of the monomer unit (a) to a sum of the monomer unit (a) and the monomer unit (b) in the copolymer is from 15 to 70% by mass.

22. A method for producing a tire, the method comprising press molding a crosslinked rubber composition comprising the copolymer according to claim 1.

23. The copolymer according to claim 1, wherein the copolymer has a melt viscosity at 38° C. of from 88 to 800 Pa·s.

* * * * *